Figure 1:
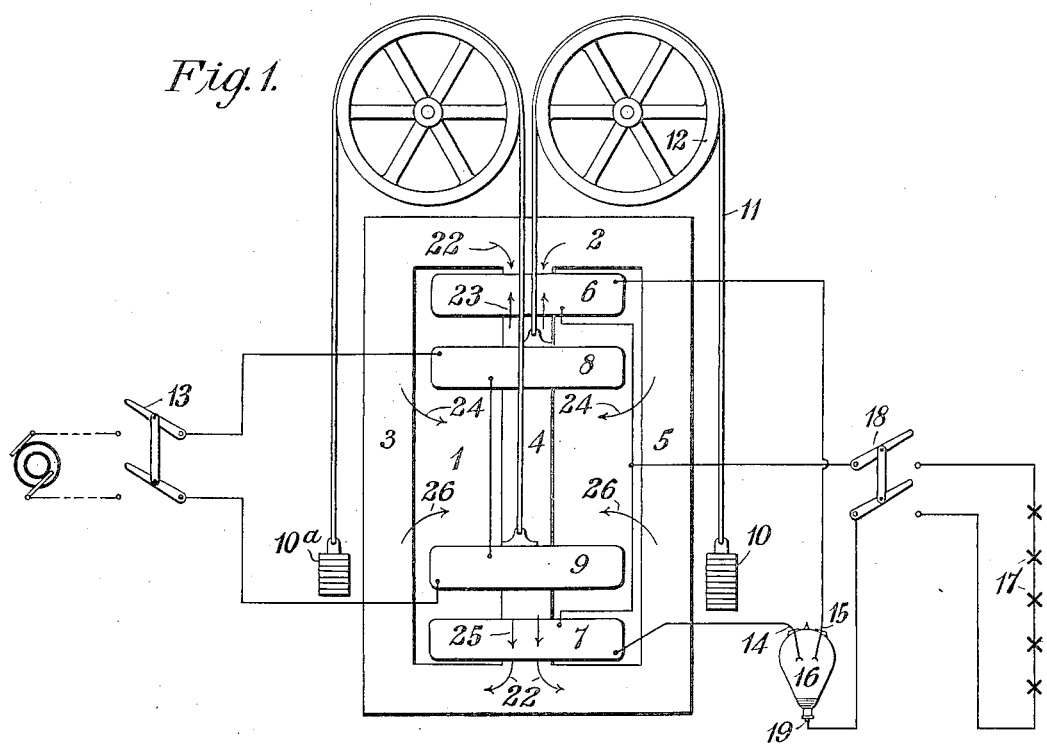

F. CONRAD.
SYSTEM OF DISTRIBUTION FOR MERCURY VAPOR RECTIFIERS.
APPLICATION FILED DEC. 6, 1907. RENEWED MAR. 8, 1909.

931,115.

Patented Aug. 17, 1909.

WITNESSES:
C. L. Belcher
Otto S. Schairer

INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

SYSTEM OF DISTRIBUTION FOR MERCURY-VAPOR RECTIFIERS.

No. 931,115. Specification of Letters Patent. Patented Aug. 17, 1909.

Application filed December 6, 1907, Serial No. 405,439. Renewed March 8, 1909. Serial No. 482,172.

*To all whom it may concern:*

Be it known that I, FRANK CONRAD, a citizen of the United States, and a resident of Swissvale, in the county of Allegheny and State of Pennsylvania, have invented a new and useful Improvement in Systems of Distribution for Mercury-Vapor Rectifiers, of which the following is a specification.

My invention relates to systems of distribution for use in connection with mercury-vapor rectifiers, and particularly to such as embody constant-current regulating devices.

The object of my invention is to provide a system of distribution of the character indicated in which separate sustaining or reactive coils, that are usually employed with mercury-vapor rectifiers, are unnecessary.

In order that the direct current delivered by a mercury-vapor rectifier may be sustained or prevented from becoming zero in value at each reversal of the alternating current, reactive devices, commonly known as sustaining coils, are usually included in the direct current circuit. However, if a constant-current regulating transformer is employed in the alternating current circuit of a rectifier, as is usually done where arc lamps or similar devices are arranged in series in the direct current circuit, a separate impedance device in the direct current circuit is unnecessary, provided the regulating transformer is constructed and the circuits of the system are arranged in accordance with the present invention.

It has heretofore been proposed to employ a regulator comprising two series-connected secondary coils that are movable between two primary coils, the terminals of the secondary winding being connected, respectively, to the alternating current terminals of the rectifier, while the series connection between the coils is also connected to one terminal of the direct current circuit that is supplied by the rectifier. With this arrangement of coils, however, it has been found, in some instances, that the regulator operates somewhat imperfectly, for reasons which will become apparent from a consideration of the forces acting between the regulator coils. In addition to the alternating primary magnetizing flux which varies with the secondary current and causes a variable repulsive force between the adjacent primary and secondary coils, there is a flux due to the unidirectional current in the secondary coils which causes a repulsion only between the secondary coils. The latter repulsive force opposes the former and thereby interferes with the most effective operation of the regulator. In order that the repulsion exerted between the secondary coils may be rendered of no effect upon the operation of the regulator, I propose, in the present application, to fix the secondary coils in position and to movably support the primary coils between the secondary coils, this being the reverse of the arrangement set forth in the aforesaid application. The only force that acts then to effect movement of the coils is that caused by the primary magnetizing flux, which is the most desirable condition of operation.

Figure 2:
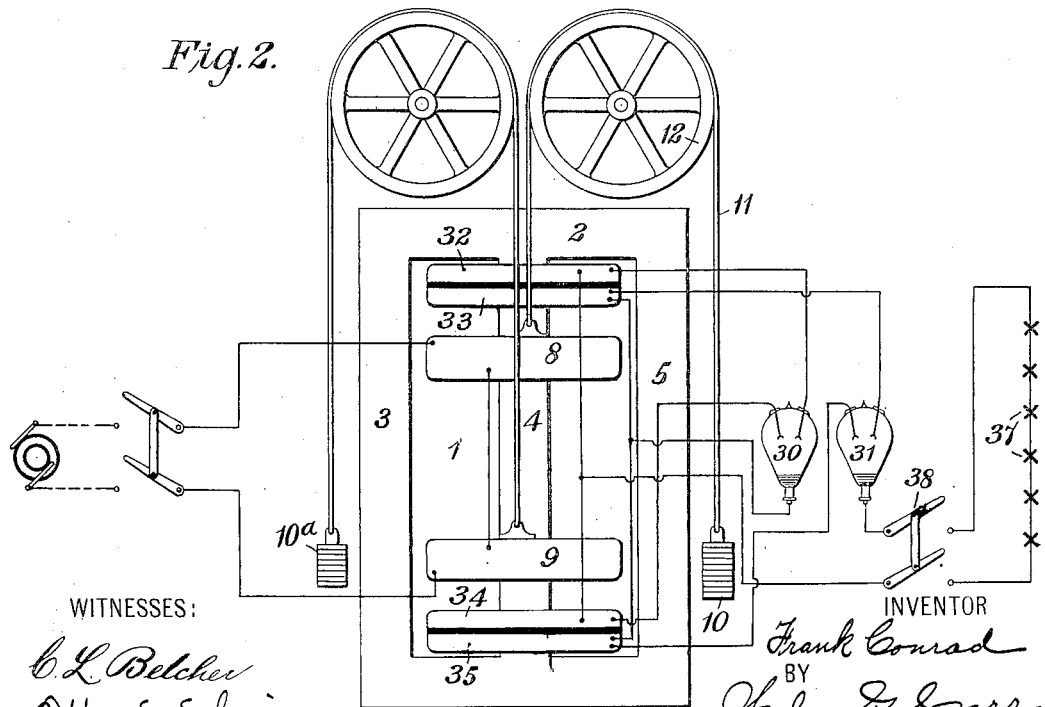

Figure 1 of the accompanying drawings is a diagrammatic view of a system of distribution embodying my invention, and Fig. 2 is a similar view of a modification of the system of Fig. 1.

In the system of Fig. 1, a constant-current regulating transformer 1 comprises a magnetizable core 2 of the shell type having three vertical legs 3, 4 and 5, two stationary series-connected secondary coils 6 and 7 that surround the middle leg 4 of the core at opposite extremities thereof, and two series-connected primary coils 8 and 9 that are relatively movable with respect to, and between the, secondary coils, a suitable space for a leakage path being left between the primary coils 8 and 9.

The primary coil 8 is normally maintained in engagement with, or closely adjacent to, the secondary coil 6 by means of a weight 10 attached to one extremity of a cord or cable 11 that passes over a pulley 12 and the other extremity of which is attached to the coil 8, and the primary coil 9 is normally maintained in engagement with, or closely adjacent to, the secondary coil 7 by its own weight, a portion of which is partially counter-balanced by a weight 10ª. The primary and secondary coils are caused to separate varying amounts in a well understood manner by the repelling magnetic forces exerted between them during the operation of the system. The terminals of the primary coils 8 and 9 may be connected to a suitable alternating current circuit by means of a switch 13, and the terminals of the secondary coils 6 and 7 are connected, respectively, to alternating current terminals 14 and 15 of a mercury-vapor rectifying device 16.

A direct current circuit, including a series of arc lamps or other suitable devices 17, may be connected by means of a switch 18 between direct current terminal 19 of the rectifier 16 and the common terminal of, or the connection between, the secondary coils 6 and 7.

In order to understand the invention, let it be first assumed that a current traverses the primary coils 8 and 9 in a direction to cause a flux in the core 2 of the regulating transformer in the direction of the arrows 22. Then, since the numbers of ampere turns in the primary and secondary coils are equal, and also since only one of the secondary coils is energized at a time, the ampere turns in the one secondary coil will be twice that in each of the primary coils. If it is further assumed that the secondary coil 6 is energized when the primary coils cause a flux in the direction of the arrows 22, the flux set up by the coil 6 will be in the direction of the arrows 23, which is opposite to that of the arrows 22. This secondary flux will also be greater than that set up by the primary coil 8, and will, therefore, cause a leakage flux between the outer legs and the inner leg of the core in the direction of the arrows 24 that will be proportional in amount to the difference of the fluxes set up by the coils 6 and 8. During the next half cycle of the alternating current in the primary coils, the flux set up by the primary coils will be opposite to that indicated by the arrows 22, while the flux set up by the secondary coil 7 will oppose the primary flux, as indicated by the arrows 25, and will be greater in amount than the flux set up by the primary coil 9, so that a leakage flux will be again set up between the outer legs and the inner leg of the core, in the direction of the arrows 26.

It will be noted that the directions of the arrows 24 and 26 are the same and that, consequently, the leakage flux between the outer legs and the middle leg of the core is always in the same direction, which flux represents energy stored in the magnetic circuit that tends to prevent changes or variations in the current in the direct current circuit in the same manner as choke coils have effected this result heretofore, and the provision of the separate sustaining coil is, therefore, unnecessary in the present system.

In Fig. 2, two current-rectifying devices 30 and 31 are supplied from the same constant-current-regulating transformer, the transformer being provided with two pairs of series-connected secondary coils 32, 33, 34 and 35, the coils 32 and 33 being secured together and located at the upper end of the core 2, while the coils 34 and 35 are secured together and located at the lower end of the core.

The alternating current terminals of the rectifier 30 are connected, respectively, to the terminals of the series-connected secondary coils 32 and 34, and the alternating current terminals of the rectifier 31 are connected, respectively, to the terminals of the series-connected secondary coils 33 and 35. The direct current terminal of the rectifier 30 is connected to the common terminal of, or the connection between, the other pair of secondary coils 33 and 35 than those to which the alternating current terminals of the said device are connected.

A direct current circuit, that includes series-connected lamps or other suitable devices 37, may be connected by means of a switch 38 between the direct current terminal of the rectifier 31 and the common terminal of, or the connection between, the other pair of secondary coils 32 and 34 than those to which the alternating current terminals of the device 31 are connected.

The operation of the system of Fig. 2 is substantially identical with that of Fig. 1 and needs no further description.

Any number of mercury-vapor rectifying devices may also be employed in connection with a single transformer by providing a suitable number of secondary windings and by properly arranging the remainder of the circuits of the system, in the manner indicated in Fig. 2.

I claim as my invention:

1. The combination with a transformer comprising two series-connected secondary coils, two series-connected primary coils relatively movable with respect to and between the secondary coils, and a magnetizable core surrounded by the said coils having a leakage path between the primary and also between the secondary coils, of a rectifying device having its alternating current terminals connected to the terminals of the said secondary coils, and a direct current circuit having one conductor connected between the direct current terminal of the rectifying device and the connection between the secondary coils.

2. The combination with a transformer comprising two pairs of series-connected secondary coils, and two series-connected primary coils relatively movable with respect to and between the secondary coils, and a magnetizable core surrounded by the said coils and provided with a leakage path between the primary coils and also between the secondary coils of each pair, of two current-rectifying devices, the alternating current terminals of which are connected to the terminals of the respective pairs of movable secondary coils, and the direct current terminal of one of which is connected to the common connection between the non-corresponding secondary coils, and a direct current circuit that is connected between the direct current terminal of the other rectifying device and the common connection between the non-corresponding pair of secondary coils.

3. The combination with a transformer comprising two series-connected secondary coils, two series-connected primary coils relatively movable with respect to the secondary coils, and a magnetizable core surrounded by the said coils having a leakage path between the primary and also between the secondary coils, of a rectifying device having its alternating current terminals connected to the terminals of the said secondary coils, and a direct current circuit having one conductor connected between the direct current terminal of the rectifying device and the connection between the secondary coils.

4. The combination with a transformer comprising two pairs of series-connected secondary coils, and two series-connected primary coils relatively movable with respect to the secondary coils, and a magnetizable core surrounded by the said coils and provided with a leakage path between the primary coils and also between the secondary coils of each pair, of two current-rectifying devices, the alternating current terminals of which are connected to the terminals of the respective pairs of movable secondary coils, and the direct current terminal of one of which is connected to the common connection between the non-corresponding secondary coils, and a direct current circuit that is connected between the direct current terminal of the other rectifying device and the common connection between the non-corresponding pair of secondary coils.

In testimony whereof, I have hereunto subscribed my name this 30th day of Nov., 1907.

FRANK CONRAD.

Witnesses:
WM. BRADSHAW,
BIRNEY HINES.